(12) United States Patent
Hong (10) Patent No.: US 10,681,523 B2
(45) Date of Patent: Jun. 9, 2020

(54) EMERGENCY WARNING SYSTEM (71) Applicant: TLE.INC, Suncheon-si (KR)

(72) Inventor: Yung Keun Hong, Suncheon-si (KR)

(73) Assignee: TLE.INC, Suncheon-si (KR)

( * ) Notice: Subject to any disclaimer, the term of this patent is extended or adjusted under 35 U.S.C. 154(b) by 0 days.

(21) Appl. No.: 16/462,603

(22) PCT Filed: Nov. 22, 2017

(86) PCT No.: PCT/KR2017/013327
§ 371 (c)(1),
(2) Date: May 21, 2019

(87) PCT Pub. No.: WO2018/097588
PCT Pub. Date: May 31, 2018

(65) Prior Publication Data
US 2020/0068373 A1    Feb. 27, 2020

(30) Foreign Application Priority Data

Nov. 23, 2016  (KR) .................. 10-2016-0156194

(51) Int. Cl.
| | |
|---|---|
| *H04M 11/04* | (2006.01) |
| *H04W 4/90* | (2018.01) |
| *G08B 5/36* | (2006.01) |
| *H04W 4/80* | (2018.01) |
| *G08B 25/14* | (2006.01) |
| *G08B 27/00* | (2006.01) |
| *G08B 25/10* | (2006.01) |

(52) U.S. Cl.
CPC ............... *H04W 4/90* (2018.02); *G08B 5/36* (2013.01); *G08B 25/10* (2013.01); *G08B 25/14* (2013.01); *G08B 27/006* (2013.01); *H04W 4/80* (2018.02)

(58) Field of Classification Search
CPC .......... H04W 4/90; H04W 4/80; G08B 25/10; G08B 27/006; G08B 5/36; G08B 25/14
USPC ....................................................... 455/404.1
See application file for complete search history.

(56) References Cited

U.S. PATENT DOCUMENTS

| | | | |
|---|---|---|---|
| 9,919,648 B1 * | 3/2018 | Pedersen | ................. G08G 1/166 |
| 10,137,834 B2 * | 11/2018 | Pedersen | .................. G06N 5/02 |
| 10,434,943 B2 * | 10/2019 | Pedersen | ................. G08G 1/048 |

(Continued)

*Primary Examiner* — Amancio Gonzalez (74) *Attorney, Agent, or Firm* — Lex IP Meister, PLLC (57) ABSTRACT

The present invention relates to an emergency warning system includes a low energy Bluetooth module, which is equipped in the delineators, that transmits a beacon signal which includes an emergency warning signal, to nearby delineators in relay and sends emergency warning signals as push notifications to nearby drivers' smartphone S1, an internet of things communication module, which is equipped in the first delineator (top repeater) and the 1 many delineators installed in regular intervals on medians or guardrails, with individually unique IDs, grouped into zones and having reflective panels and LED lights, an internet of things communication module, which is equipped in the first delineator (top repeater) and the last delineator (bottom repeater) within the zone in the direction of driving, a bottom repeater that collects emergency warning information and transmits the information to the central control server through the internet of things communication module, and a central control server.

14 Claims, 4 Drawing Sheets

(56) References Cited

U.S. PATENT DOCUMENTS

2018/0086264 A1\* 3/2018 Pedersen ............... G08G 1/0116
2018/0162275 A1\* 6/2018 Pedersen ................. G10L 25/78
2019/0054858 A1\* 2/2019 Pedersen .............. G08G 1/0116

\* cited by examiner

EMERGENCY WARNING SYSTEM

TECHNICAL FIELD

The present invention generally relates to an emergency warning system and, more particularly, to a system that can prevent secondary accidents in an event of an accident by warning drivers behind via mobile phones and delineators installed on medians and guard rails in highways.

BACKGROUND ART

Generally, medians and guard rails provide information about the road ahead to the drivers on high-speed roads, such as highways.

Thus, from the information provided by medians and guard rails, drivers can predict the shape of the road ahead and drive safely.

However, as medians and guard rails can inform the drivers about the shape of the road ahead but cannot about the accidents ahead of them, many emergency warning devices, such as No. 10-1634131 of Korean Registered Patent, were developed to inform the drivers about the emergency ahead of them in case of an accident.

The said registered patent of the Emergency Notification Alarm that is installed in regular intervals comprises A switch that an user activates to generate an activation signal in a case of an accident; a control panel that receives the activation signal and, then, generates a control signal; a caution display unit that is made of multiple LED lights and notifies the accident by lighting up or flickering according to the control signal; and, A solar battery that converts solar energy into electric energy and line stabilizes the converted electric energy to provide power.

Further, in the registered patent of the Emergency Notification Alarm, each emergency notification alarm unit receives an unique ID. The control panel of each unit includes the ID in the accident notification data and passes down the data in relay to other nearby emergency notification alarm units. Control panels of nearby emergency notification alarm units receive the accident notification data and transmit control signals if the data includes their IDs. If the data does not include their IDs, the data gets transmitted to other nearby emergency notification alarm units with IDs included in the accident notification data in relay. The caution display unit is comprised on the other side of the delineator's reflective panel. The delineators are attached to pillars of medians or guardrails, in which the delineators appear and disappear, similar to an antenna, with a small degree of rotation.

Thus, the Emergency Notification Alarm is comprised to inform the drivers behind about an occurred accident ahead when the switch is activated and the LED lights around the caution display unit flicker.

However, if the driver is informed of the accident ahead only by the flickering of the LED lights around the caution display unit as said above, the driver recognizes the occurrence of an accident ahead but cannot be informed of additional information, such as the location of the accident.

Thus, because the said invention cannot provide precise information, such as the direction of the highway, the exact lane, and how far ahead the accident occurred, the driver faced a problem of not knowing exactly when to slow down for the accident.

DETAILED DESCRIPTION OF THE INVENTION

Object of the Invention

Contrived to resolved said problems, the invention has a purpose of providing an emergency warning system that significantly reduces the danger of secondary accidents by allowing drivers behind to be better informed of the circumstances of an accident ahead through push notifications of the driver's phone via cellular server while continuing to inform the drivers about the accident ahead by the flickering of the delineators.

SUMMARY OF THE INVENTION

According to an embodiment of the present invention drawn out to achieve the said purpose, an emergency warning system comprises:

many delineators installed in regular intervals on medians or guardrails, with individually unique IDs, grouped into zones and having reflective panels and LED lights;

a low energy Bluetooth module, which is equipped in the delineators, that transmits a beacon signal which includes an emergency warning signal, to nearby delineators in relay and sends emergency warning signals as push notifications to nearby drivers' smartphone S1;

an internet of things communication module, which is equipped in the first delineator (top repeater) and the last delineator (bottom repeater) within the zone in the direction of driving, that receives control signals from delineators in the same zone and sends beacon signals via internet of things communication with a central control server:

a bottom repeater that collects emergency warning information and transmits the information to the central control server through the internet of things communication module when the emergency warning signals are received in relay from the low energy Bluetooth module; and, a central control server that processes the received emergency warning information, connects with cell service providers, and sends the processed emergency warning information as push notifications to smartphone S2 of drivers behind the location of the accident;

wherein the beacon signals among the near low energy Bluetooth modules are transmitted in an one-directional relay from the top (ahead in the direction of driving) to the bottom (behind in the direction of driving), the state control of each delineator transmit control signals from the top repeater to the bottom repeater within the same zone according to the central control server's remote control, wherein the delineators further include vibration sensors, the bottom delineator collects the vibration information detected by the vibration sensors and transmits the collected information to the central control server, which determines if similar patterns of vibration are detected in the same zone by analyzing the vibration information of each zone, detects strong rain, strong wind, and typhoons by referencing aerial weather information, transmits caution signal to the top repeater in the same zone, and activates the flickering of each delineator's LED later when each of lower delineators in the same zone receives the information in relay by the low energy Bluetooth modules.

According to another embodiment of the present invention, an emergency warning system comprises:

many delineators installed in regular intervals on medians or guardrails, with individually unique IDs, grouped into zones, and having reflective panels and LED lights;

a low energy Bluetooth module, which is equipped in the delineators, that transmits a beacon signal, which includes an emergency warning signal, to nearby delineators in relay and sends emergency warning signals as push notifications to nearby drivers' smartphone S1;

an internet of things communication module, which is equipped in the first delineator (top repeater) and the last delineator (bottom repeater) within the zone in the direction of driving, that receives control signals from delineators in the same zone and sends beacon signals via internet of things communication with a central control server;

the smartphone S1 that collects the received emergency warning information and sends to the central control server when the emergency warning signals are received as push notifications from low energy Bluetooth modules; and, a central control server that processes the received emergency warning information, connects with cell service providers, and sends the processed emergency warning information as push notifications to smartphone S2 of drivers behind the location of the accident;

wherein the beacon signals among the near low energy Bluetooth modules are transmitted in an one-directional relay from the top (ahead in the direction of driving) to the bottom (behind in the direction of driving), the state control of each delineator transmit control signals from the top repeater to the bottom repeater within the same zone according to the central control server's remote control, wherein the delineators further include vibration sensors, the bottom delineator collects the vibration information detected by the vibration sensors and transmits the collected information to the central control server, which determines if similar patterns of vibration are detected in the same zone by analyzing the vibration information of each zone, detects strong rain, strong wind, and typhoons by referencing aerial weather information, transmits caution signal to the top repeater in the same zone, and activates the flickering of each delineator's LED later when each of lower delineators in the same zone receives the information in relay by the low energy Bluetooth modules.

The smartphone S1 and the smartphone S2 have an application that displays the processed emergency warning information, such as the location of the accident, time of accident, reduced speed, and delay time.

The smartphone S1 sends a report signal about an accident or a hazard on the road to the central control server by pressing the report button displayed in the application, and said central control server linking with cell service providers sends caution signals as push notifications smartphone S1 in the cars driving behind the location of the accident.

The transmission of the beacon signal continuously relays down through various detour parallel structures when the relay transmission of the beacon signal is interfered by malfunctioning of a low power Bluetooth module in the middle.

The various detour parallel structures are that the beacon signal is transmitted to a later low energy Bluetooth module from a prior low energy Bluetooth module within the transmission range or from a delineator in a different zone on another side that received the beacon signal from the prior low energy Bluetooth module.

The transmission of the emergency warning signal stops the relay transmission of the emergency warning signal from the low energy Bluetooth module of the delineator at a certain relay count when the relay count increases by one going downwards from the origin delineator, where the emergency alarm signal starts, with the relay count of 0, and further transmits the emergency warning signal down to the top repeater in the next zone if the bottom repeat within the same zone, where the first signal originated from, does not reach the certain relay count.

A reflective panel of the delineator attached on the guardrails has a protruding middle part and thinner edges that allows reflection of the light, when shined upon, onto inner and outer parts of the road.

Effect of the Invention

According to the present invention, secondary accidents, caused by accidents ahead, can be effectively prevented by immediately providing emergency warning information to the drivers through sending the beacon signal from the delineator to the smartphone of the driver.

EMBODIMENTS

Following explains the composition and application of the preferred embodiments of the present invention.

Figure 1:
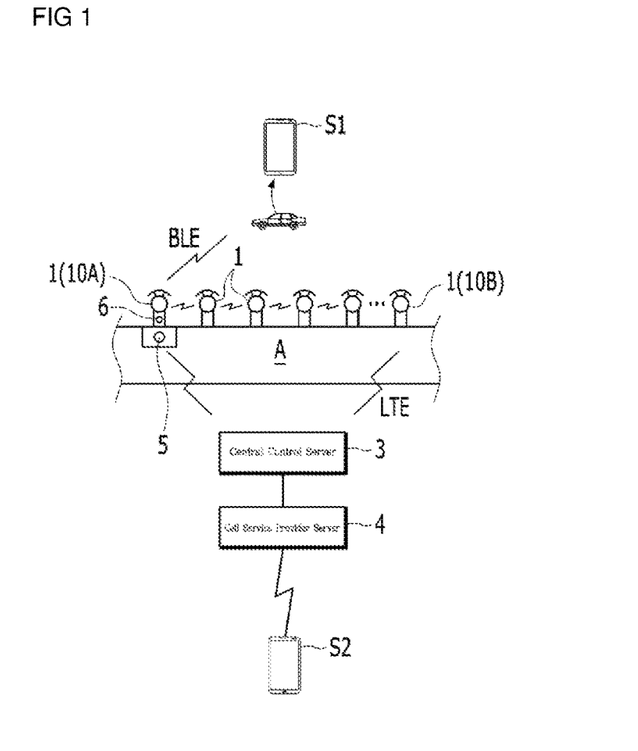
FIG. 1 is a block diagram of the emergency warning system drawn according to the embodiment of the present invention.

FIG. 1 is a block diagram of the emergency warning system drawn according to the embodiment of the present invention.

As shown in FIG. 1, the delineator (1) is installed in regular intervals (i.e. 20-30 m) on medians or guardrails (A) along the direction of driving, each delineator is assigned to its unique ID, and many (i.e. 255) delineators (1) are grouped to form a zone.

Thus, many zones are lined up consecutively along the medians or guardrails on the road.

The delineator (1) does not operate on its own discretion except for the cases of accidents or events due to inclement weather.

On the other hand, delineators (1) comprise of low energy Bluetooth (BLE) module within each delineator for relay transmission of a signal among neighboring delineators (1), and the beacon signal among the low energy Bluetooth modules is only transmitted unidirectionally from the top (ahead in the direction of driving) to the bottom (behind in the direction of driving).

Further, the emergency warning signal (beacon signal) transmitted from the low energy Bluetooth module of the delineator (1) can be sent to smartphones (S1) of nearby vehicles when the emergency switch of the nearby delineator (1) is activated in case of an accident.

Through such process, smartphones (S1) collect emergency alarm information, such as induced traffic, reduced speed, and accessible path of vehicles (figuring out which lane the accident occurred in), and send the collected information to the central control server (3), which later analyzes the information.

Through such process, Intelligent Transportation System (ITS) may be realized without any additional cost or installment of an infrastructure.

As the delineator (1) communicates the low energy Bluetooth and the smartphones (S1, S2) of the drivers operating vehicles behind the scene of an accident, the smartphones (S1, S2) in operating vehicles behind the scene of the accident receive emergency warning information about the road condition ahead from the delineators (1) as push notifications.

Thus, once the smartphone (S1) receives the beacon signal, it collects the emergency warning information and sends the information to cell service provider servers (4) through the central control server (3), where the information is processed. Then, the cell service provider server (4) sends (i.e. synching with Geofencing) the processed emergency warning information as push notifications to smartphones (S2) in other vehicles.

At this point, if the application for displaying emergency warning information is downloaded in the smartphone (S2), more detailed emergency warning system, such as the location of the accident (distance from one's vehicle), status of accident, time of accident, reduced speed, and delayed time, is provided by the smartphone (S2).

Thus, according to the origin of the invention, emergency warning information are only accurately delivered to the applications driving in the same direction on the same road through the delineator's (1) communication between the low energy Bluetooth module and the smartphones (S1, S2).

This can eliminate frequent errors of mistaking the location of vehicles at intersections or junctions of multiple highways when the emergency warning information is provided by a conventional GPS model.

Further, the application includes a displayal of a report button on the screen of the smartphone (S1) that allows drivers to report hazards, such as accidents ahead, breakdown of one's car in middle of the road, or sudden appearance of fallen objects, construction zones, or wild animals. When the report button is used, the central control server (3) receives the report signal and sends out drive with caution signal to smartphones (S2) of drivers behind the scene of hazard.

At this point, the central control server (3) may modify the signal to drive with extreme caution signal from drive with caution signal if it receives many reports.

Among many delineators in a same zone, the first delineator (top repeater (10A)) and the last delineator (bottom repeater (10B)) are comprised not only of the low energy bluetooth modules but also of an internet of things communication module, such as LTE/M module, to communicate with the central control server (3).

To control the state of each delineator (1), only the top repeater (10A) transmits control signals to lower repeaters within the same zone, and the top repeater (10) only transmits control signals to lower repeaters according to the remote control of the central control server (3).

Through such process, the top repeater (10A) controls and manages other delineators (1) in the same zone.

Further, the bottom repeater (10B) plays the role of the top repeater (10A) of the next zone.

On the other hand, when emergency warning signal is transmitted among low energy Bluetooth modules via relay transmission, the bottom repeater (10B) collects emergency warning information and sends the information to the central control server (3) via internet of things (IoT) communication modules.

The central control server (3) sends control signals (i.e. drive with caution signal) to delineators or receive emergency warning information by allowing communication between the top and bottom repeaters (10A,10B) and the internet of things.

Further, the central control server (3) manages customer relations, accidents, products, and road conditions.

On the other hand, when an emergency switch (5), which is comprised in the delineator (5), is activated, the delineator (1) of the emergency switch (5) generates the emergency warning signal (beacon signal), and as the signal gets sent down to the lower delineator (1) in relay transmission, the lower delineator (1) in the same zone of the delineator (1), where the emergency switch was activated from, receives the signal and activates the flickering of the LED (caution light).

The delineators (1) receive the power for operation from equipped solar batteries and, in case of tunnels, power cables. The delineators (1) are also comprised of many high brightness red LEDs (13).

By including an impact sensor instead of or along with the emergency switch (5), the delineator can send the magnitude of impact along with emergency warning signal down to lower delineators via relay transmission when the magnitude of impact is above a standard level.

When the magnitude of impact is detected by multiple delineators, the ID of the delineator, where the biggest magnitude is detected, becomes the site (0) of accident.

Further, being equipped with a vibration sensor (6) (motion sensor), the delineator (1) sends down the detected information (vibration information, change in acceleration or speed, and etc.) via relay transmission, the bottom repeater (10B) collects all the information and sends it to the central control server (3), and the central control server (3) analyzes each zone's vibration information, determines if similar patterns of vibration have been previously detected in the same zone, and detects strong rain, strong wind, and typhoons by referencing aerial weather information.

At this point, if the situation is determined to be a strong rain, strong wind, or typhoon, the top repeater (10A) sends out the drive with caution signal instead of the drive with extreme caution signal, which is in the case of an accident, and each of the lower delineators in the same zone receives the signal via relay transmission and activates the flickering of each of its own LED (13) at a cautionary level.

Thus, in the present invention, detection of strong rain, strong wind, and typhoon is not determined by a fog detector or a wind detector but by the vibration information from the vibration sensor (6) and the local aerial weather information.

In addition, the delineator (1) is further comprised of cameras and sends visual information to the central control server (3). The central control server (3) detects presence of fog by analyzing the received visual information and, in presence of fog, sends the drive with caution signal to the top repeater (10A) in the same zone. Each of the lower delineators in the same zone receives the signal via relay transmission from the top repeater and activates the flickering of each of its own LED (13) at a cautionary level.

Further, the images and videos of accidents and road conditions taken by the camera can be sent to the central control server (3).

In such composition of the emergency warning system, the system only functions in providing basic communication (including malfunctioning of a middle delineator) to maintain its functioning status during the day of clear skies.

Further, during the night of clear skies, the system functions in providing basic communication and maintains the lit status of LEDs (13) to guide the traffic.

Further, in case of inclement weather, the central control server (3) sends out the drive with caution signal, and the relay transmission of the drive with caution signals among the low energy Bluetooth modules allows basic communication and the LEDs (13) of delineators in the same zone to be flickering at a cautionary level.

At this point, the central control server (3) analyzes measurements of vibration sensors in delineators (1), videos from the camera, and weather information and decides whether or not to notify drivers with caution signals.

And, in case of an accident or activation of the emergency switch (5), the lower delineators in the same zone activate the flickering of their LEDs (13) at an extreme cautionary level and operate accident communications via relay transmission of emergency warning signals among nearby low energy Bluetooth modules.

At this time, the bottom repeater (10B) in the same zone sends emergency warning information, malfunction information, and videos recorded on cameras to the central control server (3) and, based on the situation, further relay the emergency warning information to the top repeater (10A) in the next zone.

Figure 2:
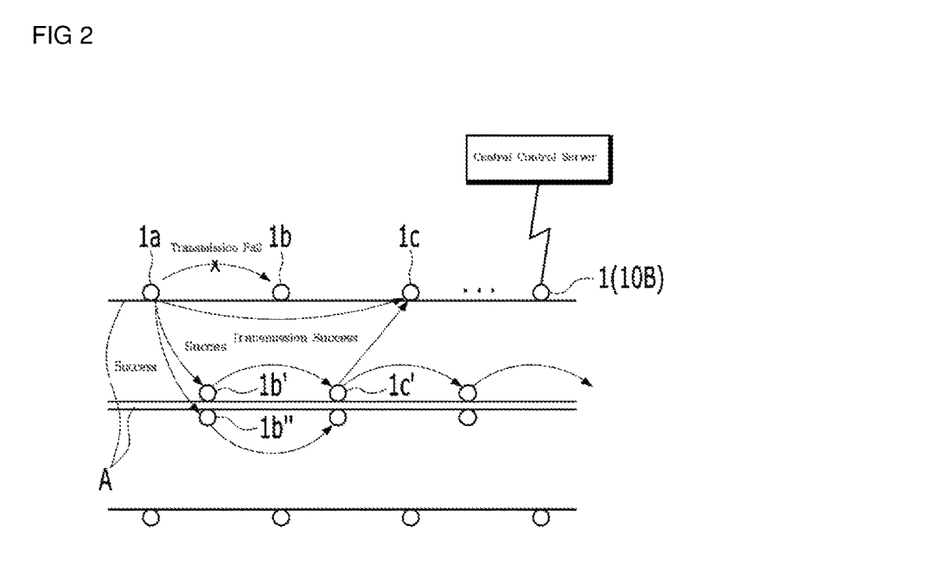
FIG. 2 is a diagram drawn to explain the detour to the lower repeater in case of malfunctioning of the delineator shown in FIG. 1.

FIG. 2 is a diagram drawn to explain the detour to the lower repeater in case of malfunctioning of the delineator shown in FIG. 1.

From FIG. 2, when the emergency warning signal (beacon signal) is transmitted to the bottom repeater (10B) through lower delineators (1*b*, 1*c*, . . . ) from the origin delineator (1*a*) in case of an accident, the next delineator (1*b*) cannot receive the signal from the origin delineator (1*a*) and cannot further relay the signal to the delineator (1*c*) two away from the origin delineator (1*a*) if the next delineator (1*b*) is malfunctioning.

At this instance, the emergency warning signal transmitted from the origin delineator (1*a*) is received by the delineator (1*c*) two away from the origin delineator (1*a*) since each low energy Bluetooth module equipped in each delineator has a communication range greater than 60 m.

At this instance, if the delineator (1*c*) two away from the origin delineator (1*a*) receives the emergency warning signal from the origin delineator (1*a*) or the next delineator (1*b*) does not receive the emergency warning signal within a specific amount of time (i.e. relay time out*1.5 hours), the next delineator (1*b*) becomes registered to have a communication malfunction, and the emergency warning signal gets transmitted to a different delineator within the communication range.

Further, nearby delineators (1*b*', 1*b*") on the other side of the median in nearby zones receive the emergency warning signal sent out from the origin delineator (1*a*) and transmit to other delineators within the communication range.

Through such process, the delineator (1*c*) two away from the origin delineator (1*a*) receives the emergency warning signal from delineators (1*b*' or 1*b*")(1*c*' or 1*c*") on either side of the median. The delineator (1*c*) two away from the origin delineator (1*a*) records the emergency warning signal from other delineators (1*b*' or 1*b*")(1*c*' or 1*c*"). In case of another communication malfunctioning of the next delineator (1*b*), the delineator (1*c*) two away from the origin delineator (1*a*) records the next delineator (1*b*) as communication malfunction and transmits the emergency warning signal to other delineators within its communication range.

As said above, in case of communication malfunctioning of the next delineator (1*b*), the delineator (1*c*) two away from the origin delineator (1*a*) can receive the emergency warning signal in three ways: detour 1 of receiving the signal from the origin delineator (1*a*), detour 2 of receiving the signal from the delineators (1*b*', 1*c*') on the left side of the median, and detour 3 of receiving the signal from the delineators (1*b*", 1*c*") on the right side of the median.

Further, by sharing parts of detour 2 and detour 3, the emergency warning signal can be received from both of the delineator (1*b*") and the delineator (1*c*').

Thus, in case of a malfunctioning of delineators in the middle, the bottom repeater (10B) may receive the emergency warning signal at all times with relay transmission through the parallel structures of detour 1, detour 2, and detour 3.

In relay transmission of the emergency warning signal, the origin delineator (1*a*) is the starting point and has the relay count of 0. As the signal gets transmitted down to lower delineators, the relay count is increased by 1 for each delineator. The next delineator (1*b*) has a relay count of 1, the delineator (1*c*) two away from the origin delineator (1*a*) has a relay count of 2, and etc. Once the relay count reaches a certain value (100 for example), the delineator with the relay count of 100 stops the relay transmission of the emergency warning signal.

On the other hand, if the last delineator of the zone, the bottom delineator (10B), does not reach the relay count of 100, the first delineator of the next zone, the top delineator (10B), receives the emergency warning signal. Following the process said above, the relay transmission continues until the relay count of 100 is reached.

Through such process, the regularly interveled delineators effectively alert the drivers about the road situation ahead by flickering their LEDs.

In such composition of the emergency warning signal, the passenger of the vehicle involved or another individual may activate the emergency switch (5) of a delineator in case of an accident.

Once the emergency switch (5) is activated, the corresponding delineator (1) generates the emergency warning signal and sends out the signal in relay to lower delineators (1).

Receiving the emergency warning signal, the delineators increase the relay count by 1, flicker the LED (13) at a cautionary level, and further passes down the signal to lower delineators.

At this point, the brightness of the LED can be distinguished by the distance away from the accident (i.e. raising the brightness by an increment of 25% from 50% to 100% at every 200 m mark away from the accident), and the rate of flickering can be faster, closer to the location of the accident.

If the emergency switch (5) is pressed again while the emergency warning signal is in relay transmission by the above process, the relay transmission among the delineators is cancelled (only applicable five seconds after the initial activation to avoid input error).

As the lower delineator receives the emergency warning signal, the delineator simultaneously sends the emergency warning signal to smartphones (S1) in nearby vehicles.

When the smartphones (S1) receive the emergency warning signal, the application downloaded in the smartphones (S1) becomes activated and alerts other smartphones (S2) with emergency warning information via push notifications.

To explain in detail, the smartphone (S1) collects the emergency warning information, such as induced traffic, reduced speed, and accessible path of vehicles (figuring out which lane the accident occurred in) and sends the collected information to the central control server (3). The central control server (3) processes the received information and links with cell service providers (4). Then, the cell service providers sends (i.e. synching with Geofencing) the processed emergency warning information, such as the location of the accident (distance from user's vehicle), time of accident, reduced speed, and delay time, to smartphones (S2) as push notifications in nearby (i.e. certain distance, 5-10 km, away from the scene of accident in the same lane) vehicles.

The smartphones (S2) in vehicles certain distance away from the scene of accident sends the vehicles' maneuvering information to the central control server (4), and the central control server (4) analyzes the received information and confirms all vehicles operation in the direction of the accident.

Through such process, the emergency warning information can be immediately and effectively delivered only to the nearby vehicles driving in the direction of the accident.

As drivers slow down and become informed of information such as the distance to the accident, reduced speed, state of accident, and etc. upon receiving the emergency warning information, the emergency warning system more effectively prevent secondary accidents compared to flickering procedure of conventional delineators.

Further, as said above, the flickering of delineators' LED (13) upon receiving the emergency warning signal helps the driver to be aware of the accident ahead.

Figure 3:
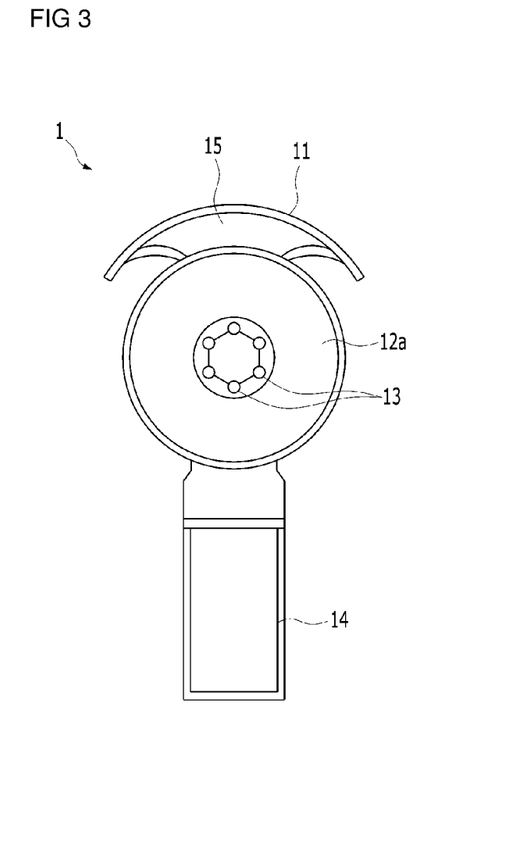
FIG. 3 and FIG. 4 are diagrams of the delineator shown in FIG. 1.
Figure 4:
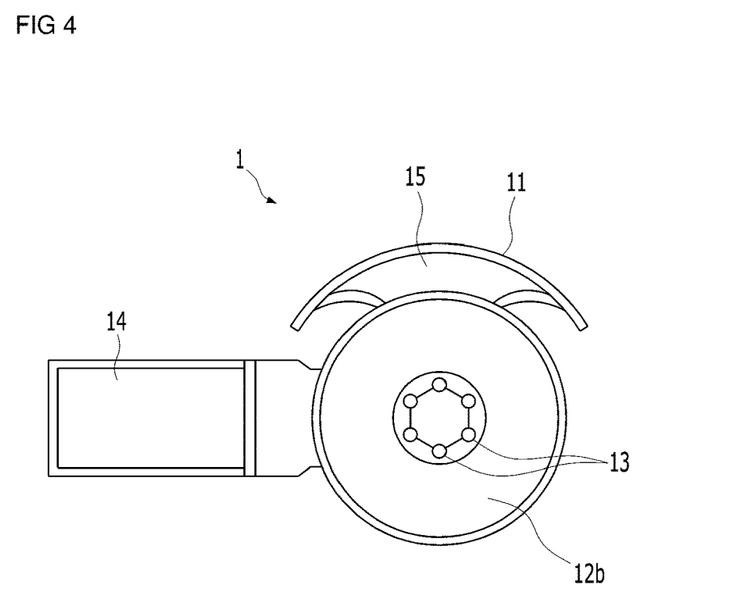

FIGS. 3 and 4 are diagrams of the delineator shown in FIG. 1; FIG. 3 is installed vertically on medians or guardrails for regular roads, and FIG. 4 is installed horizontally on the edges of cliffs for mountain roads.

A battery pack (14) in the lower compartment consists of a power supply unit. The power supply unit consists of a battery or a rechargeable battery and a secondary battery unit, such as lead-acid battery, alkaline battery, gas cell battery, lithium ion battery, nickel hydrogen battery, nickel cadmium battery, and polymer battery.

The power supply unit of the battery pack (14) receives and charges energy from the curved surface solar power panel (11) and the rotational slower power panel (15) in the upper compartment and may also receive and charge electricity from common power supply.

The solar power panels (11, 15) are installed in the upper compartment of the body, which has reflective panels (12a, 12b) on its sides, facing the sun, converts solar energy to electrical energy, and converts electrical energy in constant voltage using a DC/DC convertor to supply power to the power supply unit of the battery pack (14).

The solar power panels (11, 15) are designed in a curve or to rotate to receive more solar radiation.

The reflective panel (12a) is made up of polycarbonate material, formed in a donut shape with a hollow center part, and installed in the opposite direction of traffic, facing the drivers, to be seen by drivers.

The LED (13) is comprised in the hollow inner compartment of the cylindrical body along with the low energy Bluetooth module and/or the internet of things communication module. To be specific, the LED (13) is in the center of the hollow hole of the reflective panel (12a, 12b) and is also protected by the cover material that connects with the inner part of the reflective panel (12a, 12b).

On the other hand, the reflective panel (12b) of the delineator (1) installed on the edge of cliffs, as portrayed in FIG. 4, has a white color to protect wild animals.

Further, delineators (1), as shown in FIG. 3, installed on guardrails in areas where roadkills occur frequently are comprised of a protruding middle part and thinner edges.

Because of such composition with different angles, the reflective panel (12a) can prevent roadkills by reflecting the car lights to inner and outer parts of the road and, thus, displaying caution to all animals nearby the roads.

Figure 5:
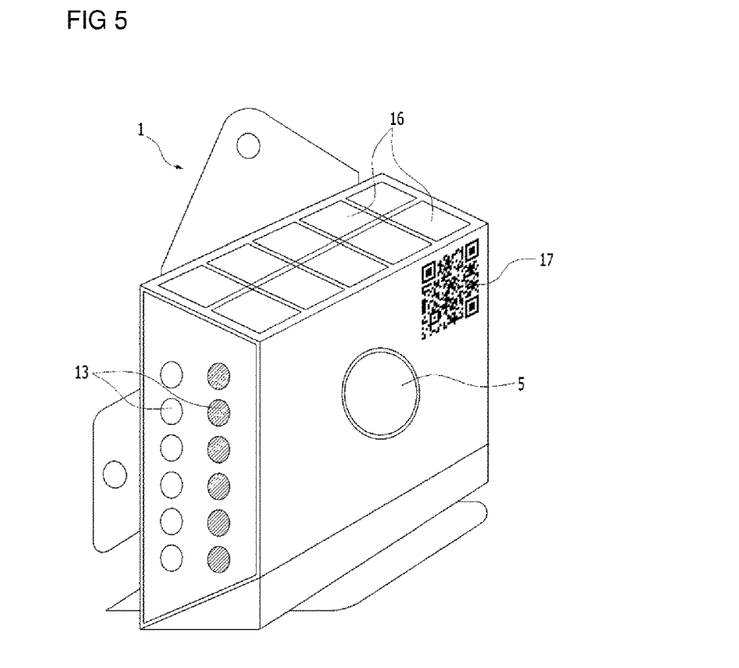
FIG. 5 and FIG. 6 are diagrams other embodiment of the delineator shown in FIG. 1.
Figure 6:
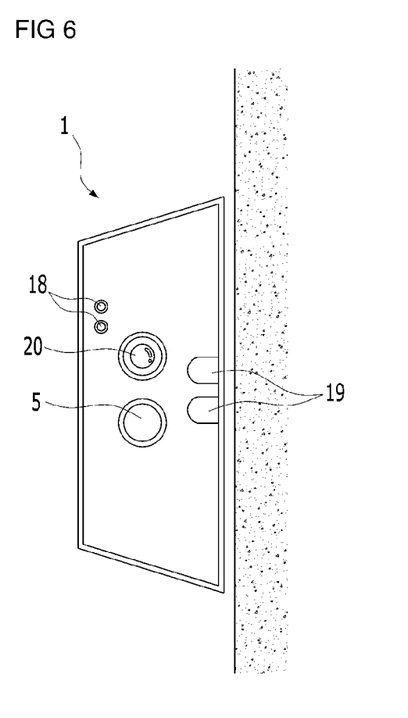

FIGS. 5 and 6 are other diagrams of the delineator shown in FIG. 1.

The main reason why the delineator (1) changes its from a cylindrical shape, as shown in FIG. 3 and FIG. 4, to a trapezoidal shape, as shown in FIG. 5 and FIG. 6, is to distinguish left and road and to have a flat bottom when installing on roads.

On the entire trapezoidal side of the delineator (1) in the opposite direction of driving, in which the drivers will be facing, multiple LEDs (13) are aligned in two rows, top and bottom. The top of the delineator (1) is comprised of multiple solar power panels (16).

The LED (13), here, is a Full color LED that allows the colors to change; it can flicker in order of white, yellow, and red as the driver gets closer to the location of the accident.

Further, the emergency switch (5), which a passenger of the vehicle involved or any other individual, activates in case of an accident and a QR code (17) that has the delineator's (1) unique ID are equipped on the side of the delineator's body that faces the road.

The side facing in the direction of driving, the backside, of the delineator (1) consists of a wired power supply port (19), in case of not being able to use the solar power panels (16) in tunnels, and another LED (18) that displays the state of functionality of the emergency switch (5), camera (20), and delineator (1).

The invention claimed is:

1. An emergency warning system comprising:
   many delineators with individually unique IDs installed in regular intervals on medians or guardrails, grouped into zone and having reflective panels and LED lights;
   a low energy Bluetooth module, which is equipped in the delineators, that transmits a beacon signal which includes an emergency warning signal, to nearby delineators in relay and sends emergency warning signals as push notifications to nearby drivers' smartphone (S1);
   an internet of things communication module, which is equipped in the first delineator (top repeater) and the last delineator (bottom repeater) within the zone in the direction of driving, that receives control signals from the delineators in the same zone and sends beacon signals via internet of things communication with a central control server:
   a bottom repeater that collects emergency warning information and transmits the information to the central control server through the internet of things communication module when the emergency warning signals are received in relay from the low energy Bluetooth module; and,
   a central control server that processes the received emergency warning information, connects with cell service providers, and sends the processed emergency warning information as push notifications to smartphone (S2) of drivers behind a location of an accident;
   wherein the beacon signals among the near low energy Bluetooth modules are transmitted in an one-directional relay from the top (ahead in the direction of driving) to the bottom (behind in the direction of driving), the state control of each delineator transmits control signals from the top repeater to the bottom repeater within the same zone according to the central control server's remote control, wherein the delineators further include vibration sensors, the bottom delineator collects the vibration information detected by the vibration sensors and transmits the collected information to the central control server, which determines if similar patterns of vibration are detected in the same zone by analyzing the vibration information of each zone, detects strong rain, strong wind, and typhoons, transmits caution signal to the top repeater in the same zone, and activates the flickering of each delineator's LED later when each of lower delineators in the same zone receives the information in relay by the low energy Bluetooth modules.

2. An emergency warning system comprising:

many delineators with individually unique IDs installed in regular intervals on medians or guardrails, grouped into zone, and having reflective panels and LED lights;

a low energy Bluetooth module, which is equipped in the delineators, that transmits a beacon signal, which includes an emergency warning signal, to nearby delineators in relay and sends emergency warning signals as push notifications to nearby drivers' smartphone (S1);

an internet of things communication module, which is equipped in the first delineator (top repeater) and the last delineator (bottom repeater) within the zone in the direction of driving, that receives control signals from delineators in the same zone and sends beacon signals via internet of things communication with a central control server;

a smartphone (S1) that collects the received emergency warning information and sends it to the central control server when the emergency warning signals are received as push notifications from the low energy Bluetooth modules; and, a central control server that processes the received emergency warning information, connects with cell service providers, and sends the processed emergency warning information as push notifications to smartphone (S2) of drivers behind the location of the accident;

wherein the beacon signals among the near low energy Bluetooth modules are transmitted in an one-directional relay from the top (ahead in the direction of driving) to the bottom (behind in the direction of driving), the state control of each delineator transmits control signals from the top repeater to the bottom repeater within the same zone according to the central control server's remote control, wherein the delineators further include vibration sensors, the bottom delineator collects the vibration information detected by the vibration sensors and transmits the collected information to the central control server, which determines if similar patterns of vibration are detected in the same zone by analyzing the vibration information of each zone, detects strong rain, strong wind, and typhoons, transmits caution signal to the top repeater in the same zone, and activates the flickering of each delineator's LED later when each of lower delineators in the same zone receives the information in relay by the low energy Bluetooth modules.

3. The emergency warning system of claim 1, wherein the smartphone (S1) and the smartphone (S2) have an application that displays the processed emergency warning information, such as the location of the accident, time of accident, reduced speed, and delay time.

4. The emergency warning system of claim 3, wherein the smartphone (S1) sends a report signal about an accident or a hazard on the road to the central control server by pressing the report button displayed in the application, and said central control server linking with cell service providers sends caution signals as push notifications the smartphone (S2) in the cars driving behind the location of the accident.

5. The emergency warning system of claim 1, wherein said transmission of the beacon signal continuously relays down through various detour parallel structures when the relay transmission of the beacon signal is interfered by malfunctioning of a low power Bluetooth module in the middle.

6. The emergency warning system of claim 5, wherein the various detour parallel structures are that the beacon signal is transmitted to a later low energy Bluetooth module from a prior low energy Bluetooth module within the transmission range or from a delineator in a different zone on another side that received the beacon signal from the prior low energy Bluetooth module.

7. The emergency warning system of claim 1, wherein said transmission of the emergency warning signal stops the relay transmission of the emergency warning signal from the low energy Bluetooth module of the delineator at a certain relay count when the relay count increases by one going downwards from the origin delineator, where the emergency alarm signal starts, with the relay count of 0, and further transmits the emergency warning signal down to the top repeater in the next zone if the bottom repeat within the same zone, where the first signal originated from, does not reach the certain relay count.

8. The emergency warning system of claim 1, wherein a reflective panel of the delineator attached on the guardrails has a protruding middle part and thinner edges that allows reflection of the light, when shined upon, onto inner and outer parts of the road.

9. The emergency warning system of claim 2, wherein the smartphone (S1) and the smartphone (S2) have an application that displays the processed emergency warning information, such as the location of the accident, time of accident, reduced speed, and delay time.

10. The emergency warning system of claim 9, wherein the smartphone (S1) sends a report signal about an accident or a hazard on the road to the central control server by pressing the report button displayed in the application, and said central control server linking with cell service providers sends caution signals as push notifications the smartphone (S2) in the cars driving behind the location of the accident.

11. The emergency warning system of claim 2, wherein said transmission of the beacon signal continuously relays down through various detour parallel structures when the relay transmission of the beacon signal is interfered by malfunctioning of a low power Bluetooth module in the middle.

12. The emergency warning system of claim 11, wherein the various detour parallel structures are that the beacon signal is transmitted to a later low energy Bluetooth module from a prior low energy Bluetooth module within the transmission range or from a delineator in a different zone on another side that received the beacon signal from the prior low energy Bluetooth module.

13. The emergency warning system of claim 2,
wherein said transmission of the emergency warning signal stops the relay transmission of the emergency warning signal from the low energy Bluetooth module of the delineator at a certain relay count when the relay count increases by one going downwards from the origin delineator, where the emergency alarm signal starts, with the relay count of 0, and
further transmits the emergency warning signal down to the top repeater in the next zone if the bottom repeat within the same zone, where the first signal originated from, does not reach the certain relay count.

14. The emergency warning system of claim 2,
wherein a reflective panel of the delineator attached on the guardrails has a protruding middle part and thinner edges that allows reflection of the light, when shined upon, onto inner and outer parts of the road.

* * * * *